United States Patent
Yoshino et al.

(10) Patent No.: US 12,132,433 B2
(45) Date of Patent: Oct. 29, 2024

(54) MOTOR DRIVER

(71) Applicant: Panasonic Intellectual Property Management Co., Ltd., Osaka (JP)

(72) Inventors: Kento Yoshino, Osaka (JP); Yusuke Nonogaki, Osaka (JP); Yusuke Imada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 17/996,341

(22) PCT Filed: Feb. 25, 2021

(86) PCT No.: PCT/JP2021/007138
§ 371 (c)(1),
(2) Date: Oct. 15, 2022

(87) PCT Pub. No.: WO2021/215111
PCT Pub. Date: Oct. 28, 2021

(65) Prior Publication Data
US 2023/0208326 A1 Jun. 29, 2023

(30) Foreign Application Priority Data
Apr. 24, 2020 (JP) ................ 2020-077803

(51) Int. Cl.
*H02P 7/06* (2006.01)
*B65H 23/032* (2006.01)
(Continued)

(52) U.S. Cl.
CPC ............ *H02P 6/17* (2016.02); *B65H 23/032* (2013.01); *H02P 23/18* (2016.02); *B65H 2553/80* (2013.01); *B65H 2555/20* (2013.01)

(58) Field of Classification Search
CPC ... H02P 6/17; H02P 23/18; H02P 5/56; B65H 2553/80
See application file for complete search history.

(56) References Cited

U.S. PATENT DOCUMENTS

| 2004/0051991 | A1* | 3/2004 | Koski | G11B 15/54 |
|---|---|---|---|---|
| | | | | 360/73.11 |
| 2009/0219643 | A1* | 9/2009 | Taylor | G11B 5/584 |
| | | | | 360/73.04 |

(Continued)

FOREIGN PATENT DOCUMENTS

| JP | 2008-299710 | 12/2008 |
|---|---|---|
| JP | 2018-139044 | 9/2018 |
| WO | 2010/087224 | 8/2010 |

OTHER PUBLICATIONS

The EPC Office Action dated Aug. 28, 2023 for the related European Patent Application No. 21791952.1.
(Continued)

*Primary Examiner* — Muhammad S Islam
(74) *Attorney, Agent, or Firm* — Rimon P.C.

(57) ABSTRACT

A motor driver drives a motor that controls a position of an object based on a command from a controller. The motor driver includes: a correction command output part that outputs a correction command for correcting a position of the motor based on a position of the object detected by a displacement sensor that detects the position of the object; and a position controller that outputs a drive signal for driving the motor based on the command from the controller and the position of the motor detected by an encoder that detects the position of the motor, or based on the correction command and the position of the motor detected by the encoder.

9 Claims, 8 Drawing Sheets

(51) Int. Cl.
H02P 6/17 (2016.01)
H02P 23/18 (2016.01)

(56) References Cited

U.S. PATENT DOCUMENTS

| | | |
|---|---|---|
| 2011/0273127 A1 | 11/2011 | Imamura et al. |
| 2013/0249465 A1 | 9/2013 | Kirihara et al. |
| 2018/0246491 A1 | 8/2018 | Shinoda et al. |
| 2020/0171661 A1* | 6/2020 | Kinugasa ............... B25J 9/1628 |

OTHER PUBLICATIONS

International Search Report of PCT application No. PCT/JP2021/007138 dated Apr. 27, 2021.

* cited by examiner

MOTOR DRIVER

FIELD OF THE INVENTION

The present disclosure relates to a motor driver that drives a motor.

Description of the Related Art

Conventionally, a motor driver that drives a motor that controls a position of an object based on a command from a controller is known.

For example, PTL 1 describes a motor driver that drives a motor on the basis of a corrected target position command that is output from a controller and to which a sensing result of a sensor that detects a position of an object is fed back.

According to the technique described in PTL 1, feedback based on the sensing result is transmitted to the motor driver via the controller. Therefore, a time lag may occur between the timing of sensing by the sensor and the timing at which the feedback is transmitted to the motor driver. Due to this time lag, the control accuracy of the position of the object may decrease.

CITATION LIST

Patent Literature

PTL 1: Unexamined Japanese Patent Publication No. 2008-299710

SUMMARY OF THE INVENTION

Therefore, an object of the present disclosure is to provide a motor driver capable of suppressing a decrease in control accuracy of a position of an object.

A motor driver according to one aspect of the present disclosure is a motor driver that drives a motor that controls a position of an object based on a command from a controller, the motor driver including: a correction command output part that outputs a correction command for correcting a position of the motor based on a position of the object detected by a displacement sensor that detects the position of the object; and a position controller that outputs a drive signal for driving the motor based on the command from the controller and the position of the motor detected by an encoder that detects the position of the motor, or based on the correction command and the position of the motor detected by the encoder.

As a result, there is provided a motor driver capable of suppressing a decrease in control accuracy of the position of the object.

DETAILED DESCRIPTION OF THE PREFERRED EMBODIMENTS

Figure 1:
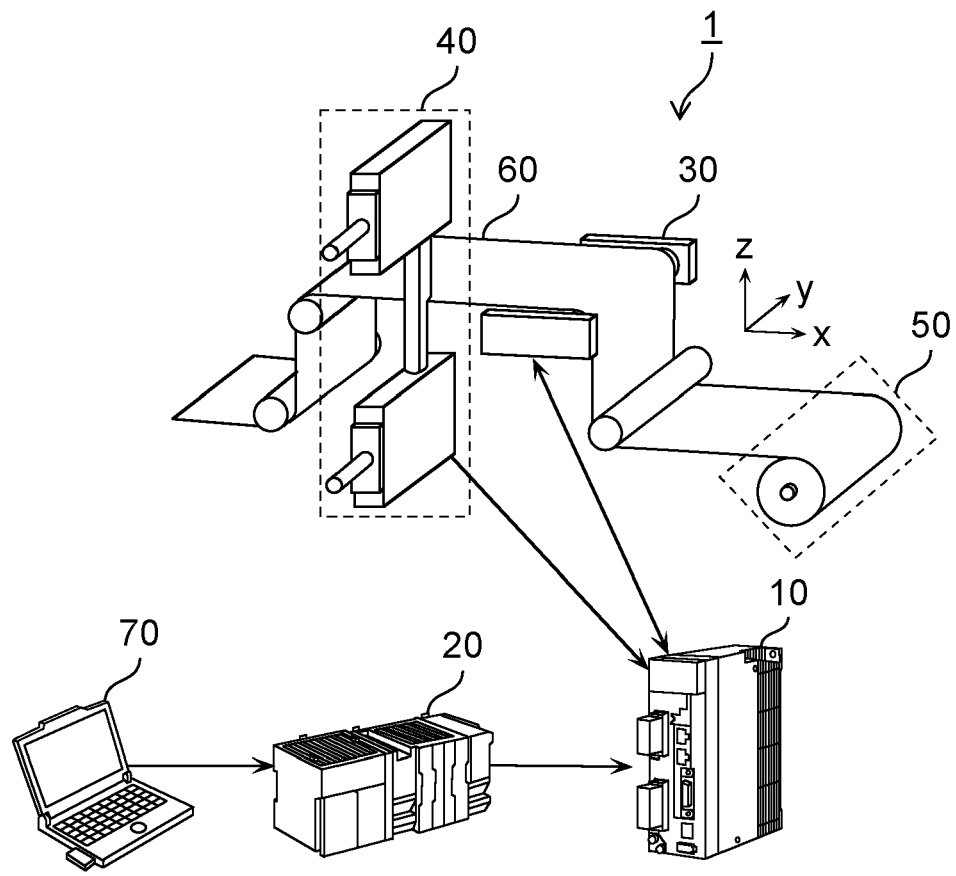
FIG. 1 is a schematic diagram illustrating a configuration of a sheet winding system according to an exemplary embodiment.

Background of Obtaining One Aspect of Present Disclosure

As described above, according to the technique described in PTL 1, the control accuracy of the position of the object may decrease due to the time lag occurring between the timing of sensing by the sensor and the timing at which the feedback is transmitted to the motor driver. Therefore, the inventors have considered that it is possible to suppress a decrease in control accuracy of the position of the object by suppressing this time lag. The inventors have extensively conducted experiments and studies on a motor driver capable of suppressing this time lag. As a result, the inventors have conceived the following motor driver.

A motor driver according to one aspect of the present disclosure is a motor driver that drives a motor that controls a position of an object based on a command from a controller, the motor driver including: a correction command output part that outputs a correction command for correcting a position of the motor based on a position of the object detected by a displacement sensor that detects the position of the object; and a position controller that outputs a drive signal for driving the motor based on the command from the controller and the position of the motor detected by an encoder that detects the position of the motor, or based on the correction command and the position of the motor detected by the encoder.

According to the motor driver having the above configuration, the position of the object detected by the displacement sensor can be fed back to the drive signal without passing through the controller. Therefore, according to the motor driver having the above configuration, the time lag is suppressed. Therefore, according to the motor driver having the above configuration, it is possible to suppress a decrease in control accuracy of the position of the object.

Further, the motor driver may further include a switching part that selectively outputs the command from the controller and the correction command, and the position controller may output the drive signal based on the command from the controller or the correction command selectively output from the switching part, and the position of the motor detected by the encoder.

As a result, interference between the command from the controller and the correction command can be suppressed.

Further, in a first state for selectively outputting the command from the controller, when a switching signal indicating switching from the first state to a second state for selectively outputting the correction command is input, the switching part may switch to the second state after a predetermined period has elapsed since the switching signal was input.

As a result, for example, the switching part can be switched from the first state to the second state after waiting until a period in which the operation of the displacement sensor is unstable elapses in a period immediately after the displacement sensor is activated.

Further, in a first state for selectively outputting the command from the controller, when a switching signal indicating switching from the first state to a second state for selectively outputting the correction command is input, and when the position of the object detected by the displacement sensor is not within a predetermined range, the switching part may switch to the second state after the position of the object detected by the displacement sensor is within the predetermined range.

As a result, the switching part automatically switches from the first state to the second state when the position of the object detected by the displacement sensor falls within the predetermined range. Therefore, when the position of the object detected by the displacement sensor falls within the predetermined range, it is possible to suppress a decrease in control accuracy of the position of the object due to the switching part not switching from the first state to the second state.

Further, in a first state for selectively outputting the command from the controller, when a switching signal indicating switching from the first state to a second state for selectively outputting the correction command is input, and when a state in which the position of the object detected by the displacement sensor is within a predetermined range is continued for a predetermined period, the switching part may switch to the second state.

As a result, in a case where a phenomenon in which a signal indicating the position of the object detected by the displacement sensor instantaneously fluctuates, for example, a phenomenon in which spike-like noise is applied, or the like occurs, it is possible to suppress malfunction of the motor driver due to this phenomenon.

Further, in a first state for selectively outputting the command from the controller, when a switching signal indicating switching from the first state to a second state for selectively outputting the correction command is input, and when the position of the object detected by the displacement sensor is not within a predetermined range at a point of time when a predetermined period elapses after the switching signal is input, the switching part may switch to the second state after the position of the object detected by the displacement sensor is within the predetermined range.

As a result, when the position of the object detected by the displacement sensor falls within the predetermined range after the lapse of the predetermined period, the switching part automatically switches from the first state to the second state. Therefore, when the position of the object detected by the displacement sensor falls within the predetermined range after the lapse of the predetermined period, it is possible to suppress a decrease in control accuracy of the position of the object due to the switching part not switching from the first state to the second state.

Further, in a first state for selectively outputting the command from the controller, when a switching signal indicating switching from the first state to a second state for selectively outputting the correction command is input, and when a state in which the position of the object detected by the displacement sensor is within a predetermined range is continued for a second predetermined period after a first predetermined period has elapsed since the switching signal was input, the switching part may switch to the second state.

As a result, in a case where a phenomenon in which the signal indicating the position detected by the displacement sensor instantaneously fluctuates, for example, a phenomenon in which spike-like noise is placed occurs after the first predetermined period has elapsed, it is possible to suppress malfunction of the motor driver due to this phenomenon.

Further, the motor driver further includes a saturation processor that performs saturation processing on the position of the object detected by the displacement sensor, and the correction command output part may output the correction command based on the position where the saturation processing has been performed.

As a result, it is possible to suppress the occurrence of a defect due to rapid driving of the motor.

Furthermore, the saturation processor may change an absolute value of a saturation value in the saturation processing to increase with time when a switching signal indicating switching the switching part from a first state for selectively outputting the command from the controller to a second state for selectively outputting the correction command is input.

As a result, it is possible to suppress the occurrence of a defect due to rapid driving of the motor caused by the switching part being switched from the first state to the second state.

Hereinafter, a specific example of a motor control device according to an aspect of the present disclosure will be described with reference to the drawings. Note that the exemplary embodiments described below each illustrate a specific example of the present disclosure. Numerical values, shapes, constituent components, arrangement positions and connection modes of the constituent components, steps, order of the steps, and the like illustrated in the following exemplary embodiments are merely examples, and therefore are not intended to limit the present disclosure. Further, each of the drawings is a schematic view, and is not necessarily precisely illustrated.

Note that the comprehensive or specific aspects of the present disclosure may be implemented by a system, a method, an integrated circuit, a computer program, or a computer-readable recording medium such as a compact disk read only memory (CD-ROM), or may be implemented by any combination of a system, a method, an integrated circuit, a computer program, and a recording medium.

Exemplary Embodiments

<Configuration>

FIG. 1 is a schematic diagram illustrating a configuration of sheet winding system 1 according to an exemplary embodiment.

As illustrated in FIG. 1, sheet winding system 1 includes motor driver 10, controller 20, position correction mechanism 30, displacement sensor 40, winder 50, object 60 (here, sheet 60), and input device 70.

Winder 50 winds object 60, that is, sheet 60. Here, winder 50 winds sheet 60 in a longitudinal direction (x-axis direction illustrated in FIG. 1).

Displacement sensor 40 detects a position of object 60. Here, displacement sensor 40 detects the position of sheet 60 in a lateral direction (y-axis direction illustrated in FIG. 1). More specifically, displacement sensor 40 is a sensor (laser displacement sensor) that irradiates the vicinity of an end part of sheet 60 in the y-axis direction illustrated in FIG. 1 with laser light, and receives at least one of reflected light of the laser light by sheet 60 and laser light not reflected by sheet 60 to detect the position of the end part of sheet 60 in the y-axis direction illustrated in FIG. 1.

When detecting the position of object 60, displacement sensor 40 outputs a position signal indicating the detected position.

Figure 2:
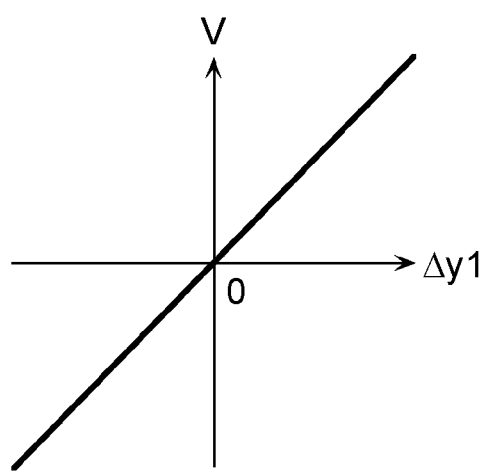
FIG. 2 is a graph illustrating a relationship between a position of an object detected by a displacement sensor and a voltage in a position signal output from the displacement sensor.

FIG. 2 is a graph illustrating a relationship between the position of object 60 detected by displacement sensor 40 and a voltage in the position signal output from displacement sensor 40.

In FIG. 2, a horizontal axis represents a difference $\Delta y1$ between the position of object 60 detected by displacement sensor 40 and a reference position, and a vertical axis represents the voltage of the position signal.

As illustrated in FIG. 2, displacement sensor 40 outputs a position signal having a voltage proportional to the difference $\Delta y1$ between the position of object 60 detected by displacement sensor 40 and the reference position.

Returning to FIG. 1 again, the description of sheet winding system 1 will be continued.

Position correction mechanism 30 includes a motor, and controls the position of object 60. Here, position correction mechanism 30 controls the position of sheet 60 in the y-axis direction illustrated in FIG. 1.

As sheet 60 is wound by winder 50, the position of sheet 60 in the y-axis direction illustrated in FIG. 1 may deviate from a desired reference position. Such displacement occurs, for example, when a thickness of sheet 60 is uneven, when rollers constituting winder 50 are worn, and the like.

Position correction mechanism 30 is a mechanism for correcting such displacement and returning the position of sheet 60 in the y-axis direction illustrated in FIG. 1 to a desired reference position.

Motor driver 10 drives a motor included in position correction mechanism 30 based on a position command from controller 20.

Figure 3:
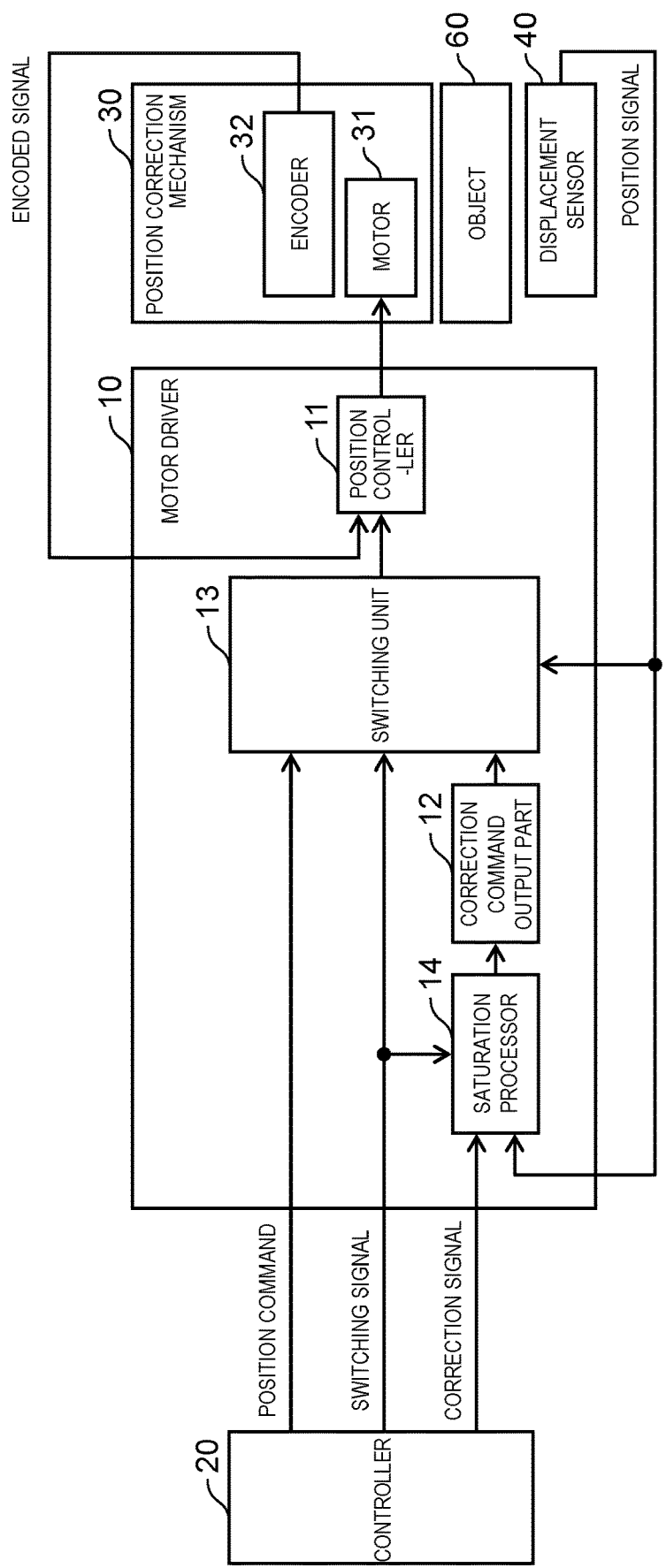
FIG. 3 is a block diagram illustrating a configuration example of a position correction mechanism and a motor driver according to the exemplary embodiment.

FIG. 3 is a block diagram illustrating a configuration example of position correction mechanism 30 and motor driver 10 according to the exemplary embodiment.

As illustrated in FIG. 3, position correction mechanism 30 includes motor 31 and encoder 32.

Motor 31 controls the position of object 60. Here, motor 31 controls the position of sheet 60 in the y-axis direction illustrated in FIG. 1. Motor 31 is driven by a drive signal (described later) output from motor driver 10. Motor 31 may be, for example, a rotary motor or a linear motor.

Encoder 32 detects the position of motor 31. When motor 31 is a rotary motor, encoder 32 detects, for example, a rotation angle of a rotary shaft of motor 31. When motor 31 is a linear motor, encoder 32 detects a position of a mover of motor 31, for example.

When detecting the position of motor 31, encoder 32 outputs an encoded signal indicating the detected position.

As illustrated in FIG. 3, motor driver 10 includes position controller 11, correction command output part 12, switching part 13, and saturation processor 14.

Saturation processor 14 receives a position signal output from displacement sensor 40, a correction signal output from controller 20 and indicating a correction amount of the position of object 60, and a switching signal (described later) output from controller 20, and (1) performs saturation processing on the position of object 60 indicated by the position signal or the correction position of object 60 indicated by the correction signal, and outputs the position signal after the saturation processing or the correction signal after the saturation processing, or (2) outputs the input position signal or the input correction signal as it is without performing the saturation processing.

Saturation processor 14 includes, for example, a processor (not illustrated) and a memory (not illustrated). Various functions of the processor may be implemented by executing a program stored in the memory.

Figure 4:
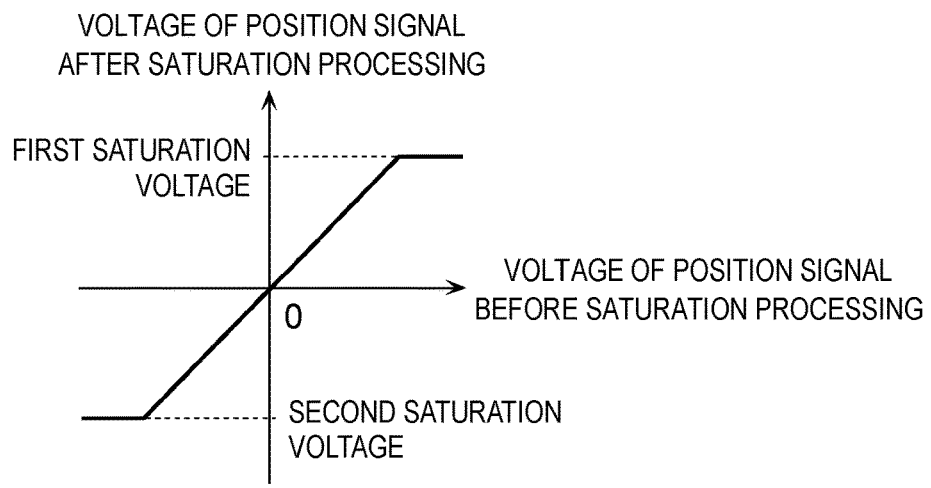
FIG. 4 is a graph illustrating a relationship between a position signal before saturation processing input to a saturation processor and a position signal after saturation processing output from the saturation processor.

FIG. 4 is a graph illustrating a relationship between the position signal before the saturation processing input to saturation processor 14 and the position signal after the saturation processing output from saturation processor 14.

In FIG. 4, a horizontal axis represents a voltage of the position signal before the saturation processing. A vertical axis represents a voltage of the position signal after the saturation processing.

As illustrated in FIG. 4, saturation processor 14 performs the saturation processing so that the maximum voltage of the output position signal after the saturation processing becomes the first saturation voltage and the minimum voltage becomes the second saturation voltage.

Figure 5:
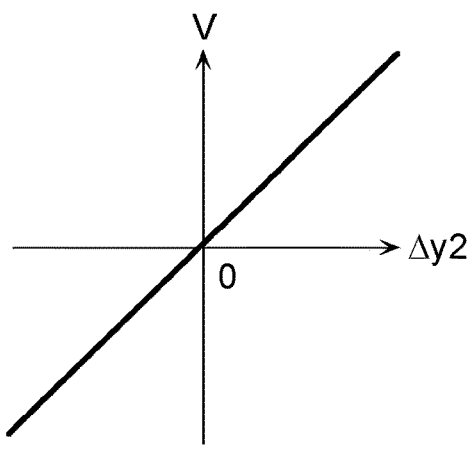
FIG. 5 is a graph illustrating a relationship between a correction amount of a position of an object and a voltage in a correction signal output from a controller.

FIG. 5 is a graph illustrating a relationship between a correction amount of the position of object 60 and the voltage in the correction signal output from controller 20.

In FIG. 5, a horizontal axis represents the correction amount $\Delta y2$ of the position of object 60, and a vertical axis represents the voltage of the analog correction signal.

As illustrated in FIG. 5, the controller 20 outputs a correction signal having a voltage proportional to the correction amount $\Delta y2$ of the position of the object 60.

Figure 6:
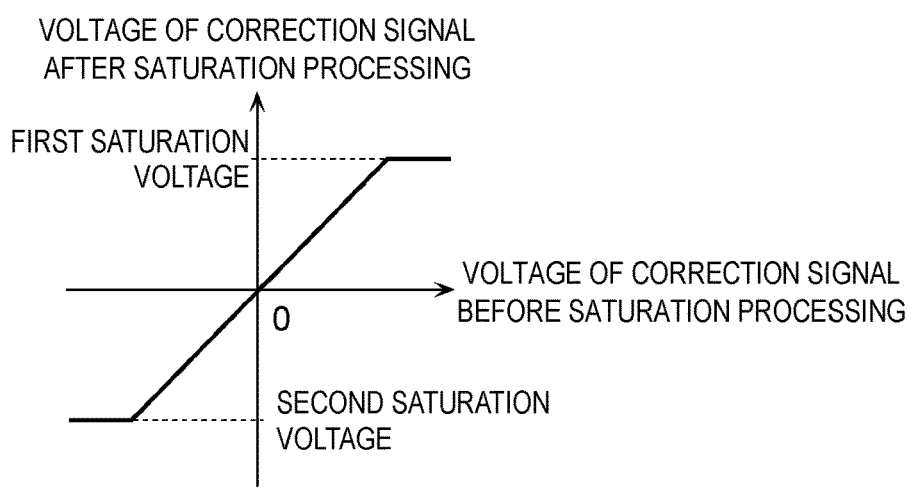
FIG. 6 is a graph illustrating a relationship between a correction signal before saturation processing input to the saturation processor and a correction signal after saturation processing output from the saturation processor.

FIG. 6 is a graph illustrating a relationship between a correction signal before saturation processing input to saturation processor 14 and a correction signal after saturation processing output from saturation processor 14.

In FIG. 6, a horizontal axis represents a voltage of the correction signal before the saturation processing, and a vertical axis represents a voltage of the correction signal after the saturation processing.

As illustrated in FIG. 6, saturation processor 14 performs the saturation processing so that the maximum voltage of the correction signal after the saturation processing to be output becomes the first saturation voltage and the minimum voltage becomes the second saturation voltage.

Saturation processor 14 has a function of changing an absolute value of the first saturation voltage and an absolute value of the second saturation voltage so as to increase with time when a switching signal is input from controller 20.

Figure 7:
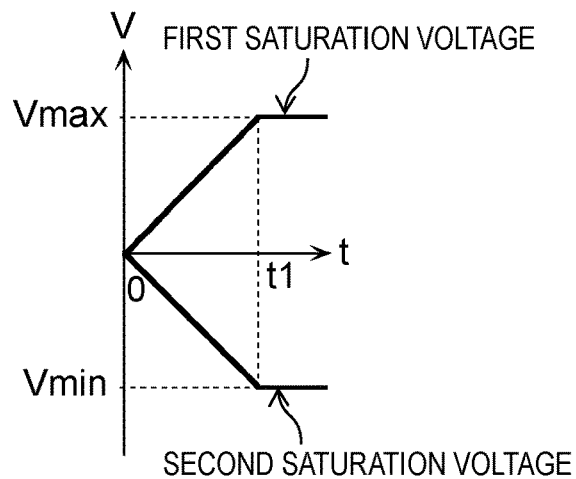
FIG. 7 is a graph illustrating a state in which the saturation processor changes an absolute value of a first saturation voltage and an absolute value of a second saturation voltage so as to increase with time.

FIG. 7 is a graph illustrating how saturation processor 14 changes the absolute value of the first saturation voltage and the absolute value of the second saturation voltage so as to increase with time.

In FIG. 7, a horizontal axis represents time when the switching signal is input as time 0, and a vertical axis represents the voltages of the first saturation voltage and the second saturation voltage.

As illustrated in FIG. 7, saturation processor 14 changes the first saturation voltage so that the absolute value of the first saturation voltage linearly increases with time so as to become the voltage 0 at time 0 and become the voltage Vmax at time t1. Further, saturation processor 14 changes the second saturation voltage so that the absolute value of the second saturation voltage linearly increases with time so as to become the voltage 0 at time 0 and become the voltage Vmin at time t1.

Returning to FIG. 3 again, the description of the motor driver 10 will be continued.

Correction command output part 12 receives the position signal or the correction signal output from saturation processor 14, and outputs a correction position command that commands a correction position of motor 31 on the basis of the position of object 60 detected by displacement sensor 40 indicated by the position signal or the correction amount of the position of object 60 indicated by the correction signal.

Here, as described above, the position signal output from displacement sensor 40 is input to correction command output part 12 via saturation processor 14, that is, not via controller 20. Therefore, the position of object 60 detected by displacement sensor 40 is fed back to a drive signal (described later) for driving motor 31 without passing through controller 20.

Correction command output part 12 includes, for example, a processor (not illustrated) and a memory (not illustrated), and various functions thereof may be implemented by the processor executing a program stored in the memory.

Switching part 13 receives the position command that is output from controller 20 and that commands the position of motor 31, the correction position command output from correction command output part 12, the switching signal output from controller 20, and the position signal output from displacement sensor 40, and selectively outputs the position command and the correction position command. Here, the switching signal is a signal for switching a state of switching part 13, more specifically, a signal for switching between a first state for selectively outputting the position command and a second state for selectively outputting the correction position command.

When switching part 13 is in the first state, motor driver 10 drives motor 31 on the basis of the position command output from controller 20. When switching part 13 is in the second state, motor driver 10 is in a state of driving motor 31 on the basis of the position signal output from displacement sensor 40 or the correction signal output from controller 20. When switching part 13 is in the second state, the position command output from controller 20 is fixed.

Switching part 13 includes, for example, a processor (not illustrated) and a memory (not illustrated), and various functions thereof may be realized by the processor executing a program stored in the memory.

Switching part 13 has the following first to fifth functions.

The first function is a function of, in a case where switching part 13 is in the first state, when a switching signal for switching from the first state to the second state is input, switching to the second state after a predetermined period has elapsed since the switching signal was input. The first function is a function realized when switching part 13 is set to a first operation mode.

The second function is a function of switching the state to the second state after the position of object 60 indicated by the position signal or the correction amount of object 60 indicated by the correction signal falls within a predetermined range if the position of object 60 indicated by the position signal does not fall within the predetermined range when the switching signal indicating switching from the first state to the second state is input in a case where switching part 13 is in the first state. The second function is a function realized when switching part 13 is set to a second operation mode.

Here, the determination as to whether or not the position of object 60 indicated by the position signal or the correction amount of object 60 indicated by the correction signal is within the predetermined range may be made, for example, by examining whether or not the voltage of the position signal or the correction signal is greater than or equal to a predetermined value. For example, the determination may be made by checking whether or not the voltage of the position signal or the correction signal is less than or equal to a predetermined value. Alternatively, the determination may be made by checking whether or not the voltage of the position signal or the correction signal is greater than or equal to a first predetermined value and less than or equal to a second predetermined value larger than the first predetermined value. Alternatively, the determination may be made by checking whether or not the voltage of the position signal or the correction signal is less than or equal to a first predetermined value or greater than or equal to a second predetermined value larger than the first predetermined value.

The third function is a function to switch the state to the second state if a state in which the position of object 60 indicated by the position signal is within a predetermined range is continued for a predetermined period when a switching signal for switching from the first state to the second state is input in a case where switching part 13 is in the first state. The third function is a function realized when switching part 13 is set to a third operation mode.

The fourth function is a function of switching the state to the second state after the position of object 60 indicated by the position signal falls within a predetermined range if the position of object 60 indicated by the position signal does not fall within the predetermined range at a point of time when a predetermined period elapses after the switching signal is input to switch the state from the first state to the second state when switching part 13 is in the first state. The fourth function is realized when switching part 13 is set to a fourth operation mode.

A fifth function is to switch the state to the second state if a state in which the position of object 60 indicated by the position signal is within a predetermined range is continued for a predetermined period after a first predetermined period has elapsed from the input of the switching signal when the switching signal for switching from the first state to the second state is input in a case where switching part 13 is in the first state. The fifth function is realized when switching part 13 is set to a fifth operation mode.

Position controller 11 receives the position command or the correction position command selectively output from switching part 13 and the encoded signal output from encoder 32, and outputs a drive signal for driving motor 31 based on the position command and the position of motor 31 indicated by the encoded signal, or based on the correction position command and the position of motor 31 indicated by the encoded signal. Here, it is assumed that the drive signal is a current that energizes motor 31 in order to drive motor 31.

Position controller 11 includes, for example, a processor (not illustrated) and a memory (not illustrated), and various functions thereof may be realized by the processor executing a program stored in the memory.

Returning to FIG. 1 again, the description of sheet winding system 1 will be continued.

Input device 70 receives an input of an operation command of sheet winding system 1 by a user who uses sheet winding system 1. Then, the operation command receiving the input is output to controller 20.

Various functions of input device 70 may be realized by, for example, a personal computer having an input and output device.

Controller 20 receives the operation command from input device 70, and generates a position command, a switching signal, and a correction signal based on the operation command. The generated position command, switching signal, and correction signal are output to motor driver 10.

Controller 20 includes, for example, a processor (not illustrated) and a memory (not illustrated), and various functions thereof may be realized by the processor executing a program stored in the memory.

<Operation>

Hereinafter, the operation performed by motor driver 10 having the above configuration will be described.

Motor driver 10 can perform first to fifth operation state change processing of changing an operation state from a state of driving motor 31 based on the position command output from controller 20 to a state of driving motor 31 based on the position signal output from displacement sensor 40 or the correction signal output from controller 20.

First, the first operation state change processing will be described.

Figure 8:
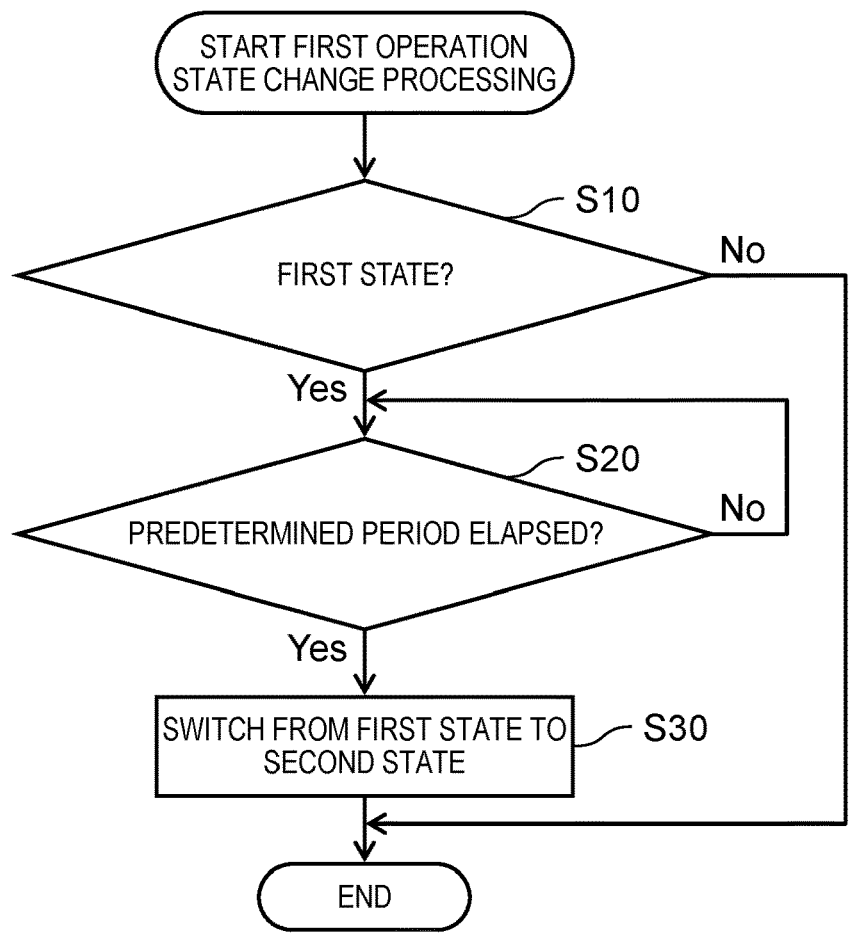
FIG. 8 is a flowchart of first operation state change processing.

FIG. 8 is a flowchart of the first operation state change processing.

For example, in a state in which switching part 13 is set to the first operation mode, the first operation state change processing is started when a switching signal for switching the state of switching part 13 from the first state to the second state, which is output from controller 20, is input to switching part 13.

When first motor drive processing is started, switching part 13 checks whether or not its own state is the first state (step S10).

In a case where its own state is the first state in the processing of step S10 (step S10: Yes), switching part 13 waits until a predetermined period elapses after the switching signal is input (step S20: No is repeated). When the predetermined period has elapsed (step S20: Yes), the state of the own device is switched from the first state to the second state (step S30). As a result, the operation state of motor driver 10 is changed from the state of driving motor 31 based on the position command output from controller 20 to the state of driving motor 31 based on the position signal output from displacement sensor 40 or the correction signal output from controller 20.

In a case where its own state is not the first state in the process of step S10 (step S10: No) and in a case where the process of step S30 is ended, motor driver 10 ends the first operation state change processing.

Figure 9:
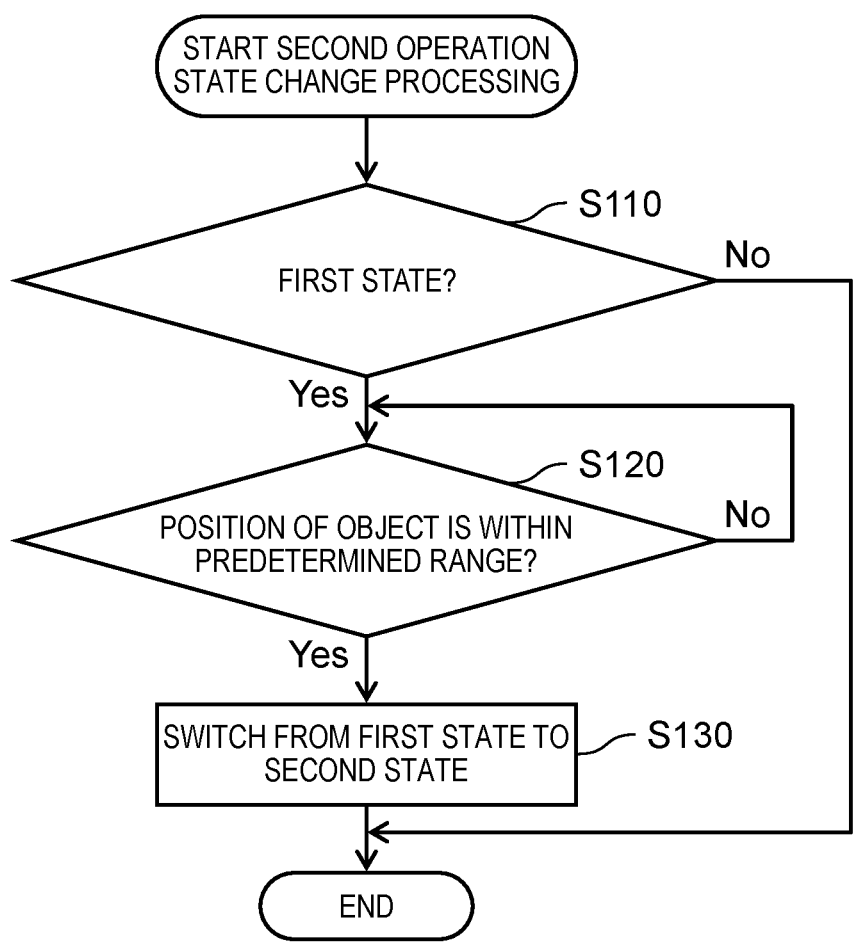
FIG. 9 is a flowchart of second operation state change processing.

FIG. 9 is a flowchart of the second operation state change processing.

For example, in a state in which switching part 13 is set to the second operation mode, the second operation state change processing is started when a switching signal for switching the state of switching part 13 from the first state to the second state, which is output from controller 20, is input to switching part 13.

When second motor drive processing is started, switching part 13 checks whether or not its own state is the first state (step S110).

In a case where its own state is the first state in the processing of step S110 (step S110: Yes), switching part 13 checks whether or not the position of object 60 indicated by the position signal is within a predetermined range (step S120).

In the process of step S120, in a case where the position of object 60 is not within the predetermined range (step S120: No), switching part 13 waits until the position of object 60 is within the predetermined range (step S120: No is repeated).

In the process of step S120, in a case where the position of object 60 is within the predetermined range (step S120: Yes), switching part 13 switches its own state from the first state to the second state (step S130). As a result, the operation state of motor driver 10 is changed from the state of driving motor 31 based on the position command output from controller 20 to the state of driving motor 31 based on the position signal output from displacement sensor 40 or the correction signal output from controller 20.

In a case where its own state is not the first state in the process of step S110 (step S110: No) and in a case where the process of step S130 is ended, motor driver 10 ends the second operation state change processing.

Figure 10:
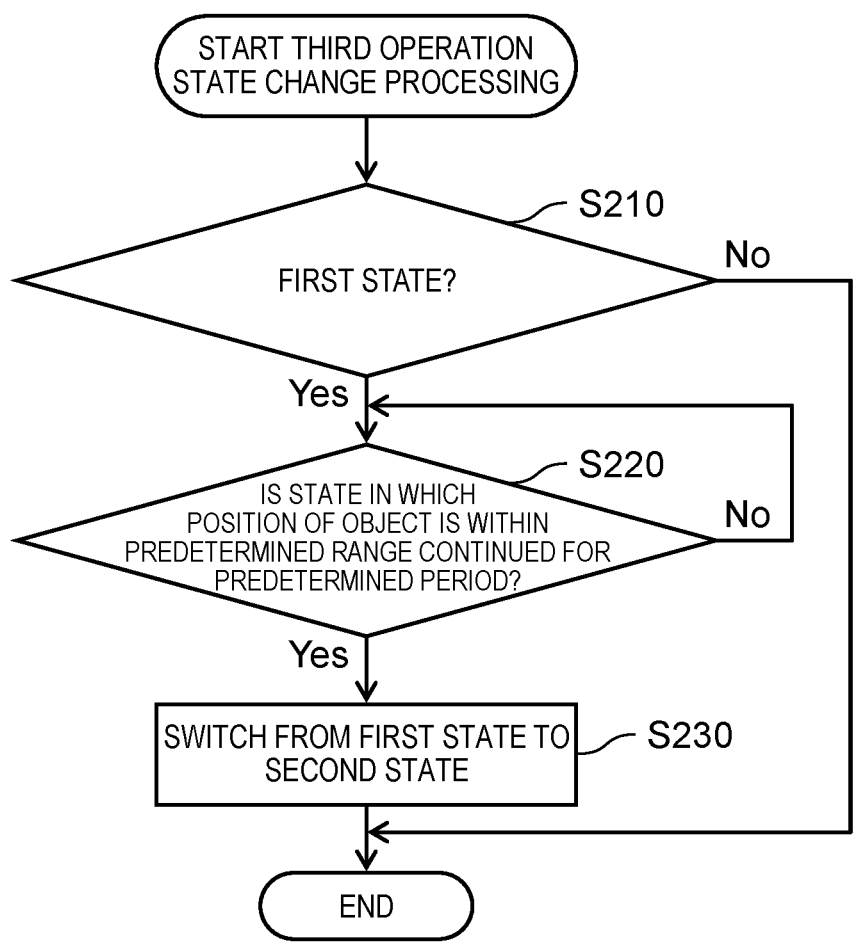
FIG. 10 is a flowchart of third operation state change processing.

FIG. 10 is a flowchart of the third operation state change processing.

For example, in a state in which switching part 13 is set to the third operation mode, the third operation state change processing is started when a switching signal for switching the state of switching part 13 from the first state to the second state, which is output from controller 20, is input to switching part 13.

When third motor drive processing is started, switching part 13 checks whether or not its own state is the first state (step S210).

In the process of step S210, in a case where its own state is the first state (step S210: Yes), switching part 13 waits until a state in which the position of object 60 indicated by the position signal is within a predetermined range is continued for a predetermined period (step S220: No is repeated). When the state in which the position of object 60 indicated by the position signal is within the predetermined range is continued for the predetermined period (Step S220: Yes), its own state is switched from the first state to the second state (Step S230). As a result, the operation state of motor driver 10 is changed from the state of driving motor 31 based on the position command output from controller 20 to the state of driving motor 31 based on the position signal output from displacement sensor 40 or the correction signal output from controller 20.

In a case where its own state is not the first state in the process of step S210 (step S210: No) and in a case where the process of step S230 is ended, motor driver 10 ends the third operation state change processing.

Figure 11:
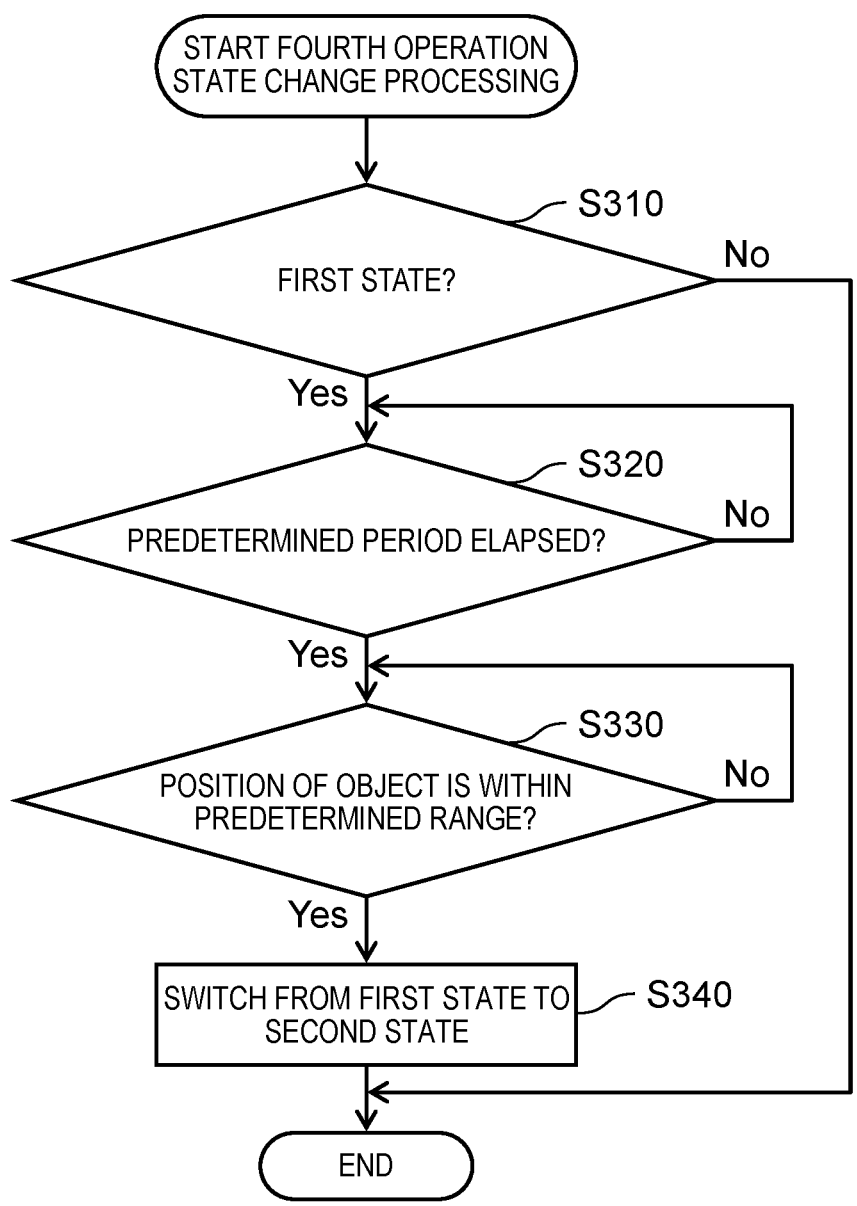
FIG. 11 is a flowchart of fourth operation state change processing.

FIG. 11 is a flowchart of the fourth operation state change processing.

The fourth operation state change processing is started when, for example, in a state where switching part 13 is set to the fourth operation mode, a switching signal for switching the state of switching part 13 from the first state to the second state, which is output from controller 20, is input to switching part 13.

When the fourth motor drive processing is started, switching part 13 checks whether or not its own state is the first state (step S310).

In the process of step S310, in a case where its own state is the first state (step S310: Yes), switching part 13 waits until a predetermined period has elapsed since the switching signal was input (step S320: repeating Yes). When the predetermined period has elapsed (step S320: No), switching part 13 checks whether or not the position of object 60 indicated by the position signal is within a predetermined range (step S330).

In the process of step S330, in a case where the position of object 60 is not within the predetermined range (step S330: No), switching part 13 waits until the position of object 60 is within the predetermined range (step S330: No is repeated).

In the process of step S330, in a case where the position of object 60 is within the predetermined range (step S330: Yes), switching part 13 switches its own state from the first state to the second state (step S340). As a result, the operation state of motor driver 10 is changed from the state of driving motor 31 based on the position command output from controller 20 to the state of driving motor 31 based on the position signal output from displacement sensor 40 or the correction signal output from controller 20.

In a case where its own state is not the first state in the process of step S310 (step S310: No) and in a case where the process of step S340 is ended, motor driver 10 ends the fourth operation state change processing.

Figure 12:
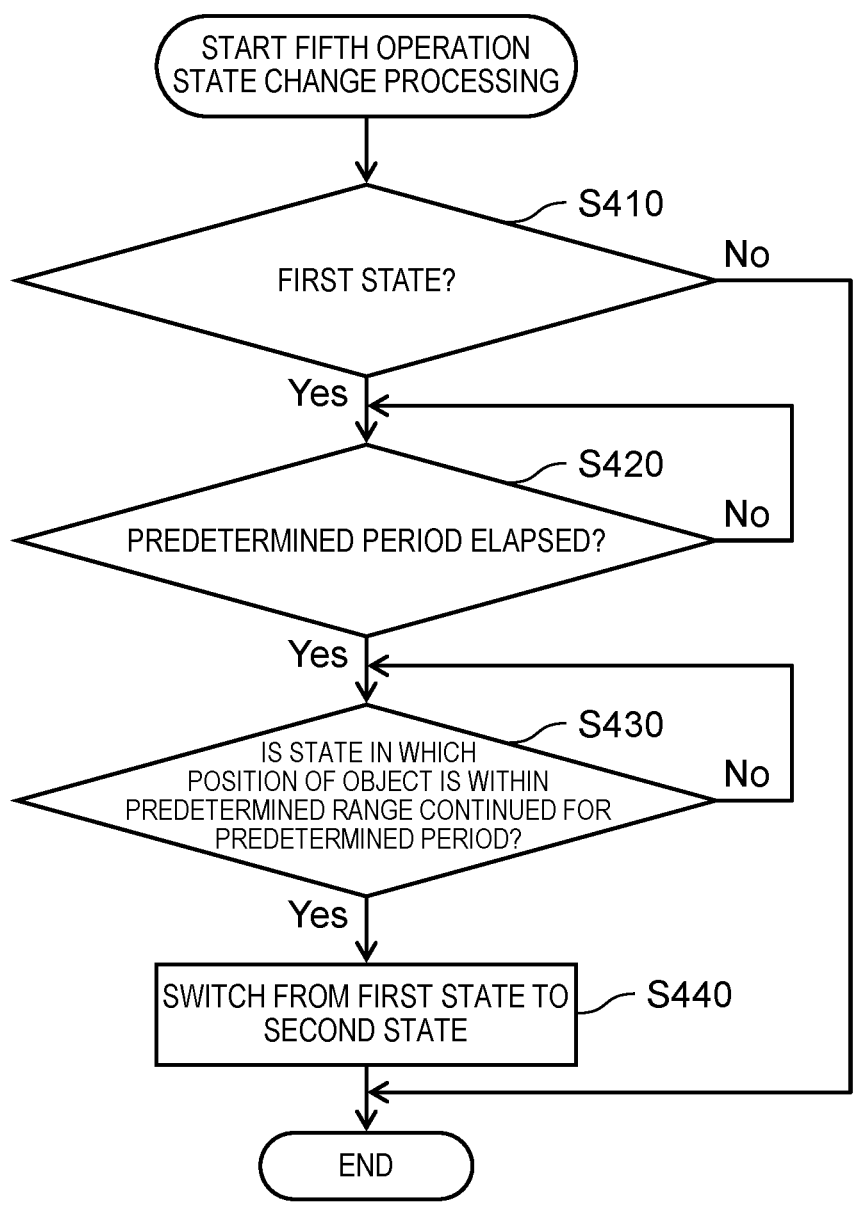
FIG. 12 is a flowchart of fifth operation state change processing.

FIG. 12 is a flowchart of the fifth operation state change processing.

For example, in a state in which switching part 13 is set to the fifth operation mode, the fifth operation state change processing is started when a switching signal for switching the state of switching part 13 from the first state to the second state, which is output from controller 20, is input to switching part 13.

When the fifth motor drive processing is started, switching part 13 checks whether or not its own state is the first state (step S410).

In the process of step S410, in a case where its own state is the first state (step S410: Yes), switching part 13 waits until a predetermined period has elapsed since the switching signal was input (step S420: repeating Yes). When the predetermined period has elapsed (step S420: No), switching part 13 waits until a state in which the position of object 60 indicated by the position signal is within a predetermined range is continued for a predetermined period (step S430: No is repeated). When the state in which the position of object 60 indicated by the position signal is within the predetermined range is continued for the predetermined period (Step S430: Yes), its own state is switched from the first state to the second state (Step S440). As a result, the operation state of motor driver 10 is changed from the state of driving motor 31 based on the position command output from controller 20 to the state of driving motor 31 based on the position signal output from displacement sensor 40 or the correction signal output from controller 20.

In a case where its own state is not the first state in the process of step S410 (step S410: No) and in a case where the process of step S440 is ended, motor driver 10 ends the fifth operation state change processing.

<Consideration>

According to motor driver 10, the position of object 60 detected by displacement sensor 40 can be fed back to the drive signal without passing through controller 20. As a result, a time lag between the timing of sensing by the sensor and the timing at which feedback is transmitted to the motor driver, which occurs in the technique described in PTL 1, is suppressed. Therefore, according to motor driver 10, it is possible to suppress a decrease in control accuracy of the position of object 60.

According to motor driver 10, switching part 13 selectively outputs the position command and the correction position command. Accordingly, interference between the position command and the correction position command can be suppressed.

According to motor driver 10, in the first state, when a switching signal for switching from the first state to the second state is input, switching part 13 can switch to the second state after a predetermined time has elapsed since the switching signal was input. Therefore, for example, switching part 13 can be switched from the first state to the second state after waiting until a period in which the operation of displacement sensor 40 is unstable elapses in a period immediately after displacement sensor 40 is activated.

According to motor driver 10, in the first state, when the switching signal for switching from the first state to the second state is input, if the position of object 60 detected by displacement sensor 40 is not within a predetermined range, switching part 13 can switch to the second state after the position of object 60 detected by displacement sensor 40 is within the predetermined range. Accordingly, when the position of object 60 detected by displacement sensor 40 falls within the predetermined range, switching part 13 automatically switches from the first state to the second state. Therefore, when the position of object 60 detected by displacement sensor 40 falls within the predetermined range, it is possible to suppress a decrease in control accuracy of the position of object 60 due to switching part 13 not switching from the first state to the second state.

According to motor driver 10, in the first state, when a switching signal for switching from the first state to the second state is input, switching part 13 can switch to the second state if a state in which the position of object 60 detected by displacement sensor 40 is within a predetermined range is continued for a predetermined period. Therefore, in a case where a phenomenon in which a signal indicating the position of object 60 detected by displacement sensor 40 instantaneously fluctuates, for example, a phenomenon in which spike-like noise is applied, or the like occurs, it is possible to suppress a malfunction of motor driver 10 due to this phenomenon.

According to motor driver 10, in the case of the first state, when the switching signal to switch from the first state to the second state is input, if the position of object 60 detected by displacement sensor 40 is not within a predetermined range at a point of time when a predetermined time elapses after the switching signal is input, switching part 13 can switch to the second state after the position of object 60 detected by displacement sensor 40 becomes within the predetermined range. Accordingly, when the position of object 60 detected by displacement sensor 40 falls within the predetermined range after a lapse of the predetermined time, switching part 13 automatically switches from the first state to the second state. Therefore, when the position of object 60 detected by displacement sensor 40 falls within the predetermined range after the lapse of the predetermined time, it is possible to suppress a decrease in control accuracy of the position of object 60 due to switching part 13 not switching from the first state to the second state.

According to motor driver 10, in the case of the first state, when the switching signal to switch from the first state to the second state is input, switching part 13 can switch to the second state if a state in which the position of object 60 detected by displacement sensor 40 is within a predetermined range is continued for a second predetermined period after a first predetermined period has elapsed from the input of the switching signal. Therefore, in a case where a phenomenon in which a signal indicating the position of object 60 detected by displacement sensor 40 instantaneously fluctuates, for example, a phenomenon in which spike-like noise is placed occurs after the first predetermined period has elapsed, it is possible to suppress a malfunction of motor driver 10 due to this phenomenon.

According to motor driver 10, saturation processor 14 can perform saturation processing on the position of object 60 detected by displacement sensor 40, and correction command output part 12 can output a second drive signal on the basis of the position where the saturation processing has been performed. Therefore, it is possible to suppress the occurrence of a defect due to rapid driving of motor 31.

According to motor driver 10, when the switching signal for switching switching part 13 from the first state to the second state is input, saturation processor 14 can change an absolute value of a saturation value in the saturation processing so as to increase with time. Therefore, it is possible to suppress the occurrence of a defect due to rapid driving of motor 31 due to the switching of switching part 13 from the first state to the second state.

Other Exemplary Embodiments

As described above, the exemplary embodiment has been described as an illustration of the techniques disclosed in the present application. However, the techniques according to the present disclosure are not limited thereto, and are also applicable to exemplary embodiments in which changes, replacements, additions, omissions, and the like are made as appropriate without departing from the gist of the present disclosure.

(1) In the exemplary embodiment, as an example of object 60, object 60 has been described as a sheet. However, object 60 may be any object as long as the position can be controlled by motor 31, and is not necessarily limited to the example of the sheet.

(2) In the exemplary embodiment, the command output from controller 20 to motor driver 10 has been described as a position command that commands the position of motor 31. However, the command output from controller 20 to motor driver 10 is not necessarily limited to the position command as long as it is a command for driving motor 31. For example, the command output from controller 20 to motor driver 10 may be a speed command that commands the speed of motor 31. In this case, position controller 11 outputs a drive signal for driving motor 31 based on the speed command and the position of motor 31 indicated by the encoded signal. For example, the command output from controller 20 to motor driver 10 may be a torque command that commands acceleration of motor 31. In this case, position controller 11 outputs a drive signal for driving motor 31 based on the torque command and the position of motor 31 indicated by the encode signal.

(3) In the exemplary embodiment, it has been described that the command output from correction command output part 12 is the correction position command that commands the correction position of motor 31. However, the command output from correction command output part 12 is not necessarily limited to the example of the correction position command as long as it is a command for driving motor 31. For example, the command output from correction command output part 12 may be a correction speed command that commands the speed of motor 31. In this case, position controller 11 outputs a drive signal for driving motor 31 based on the correction speed command and the position of motor 31 indicated by the encoded signal. For example, the command output from correction command output part 12 may be a correction torque command that commands acceleration of motor 31. In this case, position controller 11 outputs a drive signal for driving motor 31 based on the correction torque command and the position of motor 31 indicated by the encoded signal.

(4) In the exemplary embodiment, the description has been given assuming that displacement sensor 40 is a laser displacement sensor that detects the position of object 60 by receiving laser light. However, displacement sensor 40 is not necessarily limited to the example of the laser displacement sensor as long as it can detect the position of object 60. For example, displacement sensor 40 may be a pressure displacement sensor that detects the position of object 60 by detecting the pressure. For example, a temperature displacement sensor that detects the position of object 60 by detecting the temperature may be used. The acceleration displacement sensor may detect the position of object 60 by detecting acceleration.

(5) In the exemplary embodiment, it has been described that the position command transmitted from controller 20 to switching part 13 is fixed when switching unit 13 is in the second state. However, in this case, the position command transmitted from controller 20 to switching part 13 is not necessarily fixed, and may not be fixed.

The present disclosure is widely applicable to a motor driver that drives a motor.

The invention claimed is:

1. A motor driver that drives a motor that controls a position of an object based on a command from a controller, the motor driver comprising:
a correction command output part that outputs a correction command for correcting a position of the motor based on a position of the object detected by a displacement sensor that detects the position of the object; and
a position controller that outputs a drive signal for driving the motor based on the command from the controller and a position of the motor detected by an encoder that detects the position of the motor, or based on the correction command and the position of the motor detected by the encoder.

2. The motor driver according to claim 1, further comprising a switching part that selectively outputs the command from the controller and the correction command,
wherein the position controller outputs the drive signal based on the command or the correction command selectively output from the switching part, and the position of the motor detected by the encoder.

3. The motor driver according to claim 2, wherein in a first state for selectively outputting the command from the controller, when a switching signal indicating switching from the first state to a second state for selectively outputting the correction command is input, the switching part switches to the second state after a predetermined period has elapsed since the switching signal was input.

4. The motor driver according to claim 2, wherein in a first state for selectively outputting the command from the controller, when a switching signal indicating switching from the first state to a second state for selectively outputting the correction command is input, and when the position of the object detected by the displacement sensor is not within a predetermined range, the switching part switches to the second state after the position of the object detected by the displacement sensor is within the predetermined range.

5. The motor driver according to claim 2, wherein in a first state for selectively outputting the command from the controller, when a switching signal indicating switching from the first state to a second state for selectively outputting the correction command is input, and when a state in which the position of the object detected by the displacement sensor is within a predetermined range is continued for a predetermined period, the switching part switches to the second state.

6. The motor driver according to claim 2, wherein in a first state for selectively outputting the command from the controller, when a switching signal indicating switching from the first state to a second state for selectively outputting the correction command is input, and when the position of the object detected by the displacement sensor is not within a predetermined range at a point of time when a predetermined period elapses after the switching signal is input, the switching part switches to the second state after the position of the object detected by the displacement sensor is within the predetermined range.

7. The motor driver according to claim 2, wherein in a first state for selectively outputting the command from the controller, when a switching signal indicating switching from the first state to a second state for selectively outputting the correction command is input, and when a state in which the position of the object detected by the displacement sensor is within a predetermined range is continued for a second predetermined period after a first predetermined period has elapsed since the switching signal was input, the switching part switches to the second state.

8. The motor driver according to claim 1, further comprising a saturation processor that performs saturation processing on the position of the object detected by the displacement sensor, wherein the correction command output part outputs the correction command based on the position where the saturation processing has been performed.

9. The motor driver according to claim 8, wherein the saturation processor changes an absolute value of a saturation value in the saturation processing to increase with time when a switching signal indicating switching a switching part from a first state for selectively outputting the command from the controller to a second state for selectively outputting the correction command is input.

* * * * *